(12) United States Patent
Mahjouri-Samani et al.

(10) Patent No.: US 12,123,845 B2
(45) Date of Patent: Oct. 22, 2024

(54) TWO-DIMENSIONAL-MATERIAL-BASED FIELD-EFFECT TRANSISTOR FOR DETECTION OF PATHOGENS AND METHODS FOR MANUFACTURING

(71) Applicants: AUBURN UNIVERSITY, Auburn, AL (US); MERCER UNIVERSITY, Macon, GA (US)

(72) Inventors: Masoud Mahjouri-Samani, Auburn, AL (US); Michael C. Hamilton, Auburn, AL (US); Marcelo Kuroda, Auburn, AL (US); Sahar Hasim, Macon, GA (US); Parvin Fathi-Hafshejani, Auburn, AL (US)

(73) Assignees: AUBURN UNIVERSITY, Auburn, AL (US); MERCER UNIVERSITY, Macon, GA (US)

( * ) Notice: Subject to any disclaimer, the term of this patent is extended or adjusted under 35 U.S.C. 154(b) by 367 days.

(21) Appl. No.: 17/522,421

(22) Filed: Nov. 9, 2021

(65) Prior Publication Data

US 2022/0146451 A1 May 12, 2022

Related U.S. Application Data

(60) Provisional application No. 63/245,444, filed on Sep. 17, 2021, provisional application No. 63/111,892, filed on Nov. 10, 2020.

(51) Int. Cl.
*G01N 27/414* (2006.01)

(52) U.S. Cl.
CPC .................. *G01N 27/4145* (2013.01)

(58) Field of Classification Search
CPC .................................... G01N 27/4145
See application file for complete search history.

(56) References Cited

U.S. PATENT DOCUMENTS

| 2013/0075793 A1* | 3/2013 | Higuchi | H01L 29/78 257/252 |
| 2017/0102357 A1* | 4/2017 | Liang | G01N 27/4145 |

* cited by examiner

*Primary Examiner* — Douglas M Menz
(74) *Attorney, Agent, or Firm* — Barnes & Thornburg LLP (57) ABSTRACT

In at least one illustrative embodiment, a field-effect transistor biosensor for detection of a pathogen includes a substrate and a channel formed from a two-dimensional monolayer or few-layer metal chalcogenide that is functionalized with a biorecognition element. The biorecognition element may be an antibody, such as an antibody for the SARS-CoV-2 spike protein. A method for manufacturing the biosensor includes depositing an amorphous two-dimensional material on the substrate with pulsed laser ablation, crystallizing the amorphous two-dimensional material to generate a two-dimensional monolayer coupled to the substrate, and activating a surface of the two-dimensional material with the biorecognition element after crystallizing the amorphous two-dimensional material. The composition of the two-dimensional material may be tuned. The substrate may be photolithographically patterned. Other embodiments are described and claimed.

14 Claims, 6 Drawing Sheets

TWO-DIMENSIONAL-MATERIAL-BASED FIELD-EFFECT TRANSISTOR FOR DETECTION OF PATHOGENS AND METHODS FOR MANUFACTURING

CROSS-REFERENCE TO RELATED APPLICATIONS

The present application claims priority under 35 U.S.C. § 119(e) to U.S. Provisional Application Ser. No. 63/111,892, filed Nov. 10, 2020, and to U.S. Provisional Application Ser. No. 63/245,444, filed on Sep. 17, 2021, the entire disclosure of each of which is hereby incorporated by reference.

BACKGROUND

Emerging infectious diseases caused by pathogens are a global threat. For example, the novel coronavirus disease (COVID-19) produced by the severe acute respiratory syndrome coronavirus 2 (SARS-CoV-2) spread rapidly to most continents and was classified as a pandemic in March 2020. Typically, the only specific diagnostic test for the detection of COVID-19 available is real-time reverse transcription polymerase chain reaction (RT-PCR). Several types of RT-PCR SARS-CoV-2 kits have been produced and approved; however the RT-PCR test is very time consuming.

Field-effect transistors (FET) have been studied as potential selective biosensors. For example, a graphene-based FET biosensor has been used to identify SARS-CoV-2 spike protein. Graphene has high electron mobility, but because of graphene's near-zero bandgap, the off-state current leakage in graphene-based biosensors, might increase, resulting in false signals.

Semiconducting two-dimensional (2D) materials such as 2D transition metal dichalcogenides have also been studied for potential biosensing applications. Typical techniques for manufacturing 2D materials, such as chemical vapor deposition (CVD) or molecular beam epitaxy (MBE), may not be compatible with photolithographic techniques. For example, CVD typically operates at relatively high temperatures that are not compatible with photolithography.

SUMMARY

According to one aspect, a field-effect transistor biosensor to detect pathogens in a sample includes a substrate and a channel coupled to the substrate. The channel comprises a two-dimensional monolayer or few-layer metal chalcogenide that is functionalized with a biorecognition element. In some embodiments, the biorecognition element comprises an antibody.

In some embodiments, the biosensor further includes a probe linker that attaches the biorecognition element to the two-dimensional monolayer metal chalcogenide. In some embodiments, the probe linker binds to vacancy defects on a surface of the metal chalcogenide.

In some embodiments, the biosensor further includes a gate electrode coupled to an ionic solution, wherein the ionic solution is in contact with the two-dimensional monolayer metal chalcogenide. In some embodiments, the ionic solution is mixed with the sample.

In some embodiments, the two-dimensional monolayer or few-layer metal chalcogenide comprises a transition metal dichalcogenide. In some embodiments, the transition metal dichalcogenide has a composition of $MX_{1.5-2}$. In some embodiments, the transition metal dichalcogenide comprises tungsten diselenide.

In some embodiments, the two-dimensional monolayer or few-layer metal chalcogenide comprises a metal monochalcogenide. In some embodiments, the metal monochalcogenide has a composition of $MX_{0.75-1}$.

In some embodiments, the biosensor further includes a source electrode and a drain electrode. The electrodes are coupled to the channel. In some embodiments, each of the source electrode and the drain electrode include a plurality of interdigitated fingers.

According to another aspect, a method for manufacturing a field-effect transistor biosensor to detect pathogens in a sample includes depositing an amorphous two-dimensional material on a substrate with pulsed laser ablation; crystallizing the amorphous two-dimensional material to generate a two-dimensional monolayer or few-layer coupled to the substrate; and activating a surface of the two-dimensional material with a biorecognition element for pathogen detection after crystallizing the amorphous two-dimensional material.

In some embodiments, depositing the amorphous two-dimensional material comprises depositing the amorphous two-dimensional material at ambient temperature; and crystallizing the amorphous two-dimensional material comprises crystallizing the amorphous two-dimensional material with a thermal oven. In some embodiments, depositing the amorphous two-dimensional material at ambient temperature comprises depositing the amorphous two-dimensional material at an operating temperature below 150° C.

In some embodiments, the two-dimensional material comprises a compositionally tunable transition metal dichalcogenide. In some embodiments, the transition metal dichalcogenide has a composition of $MX_{1.5-2}$.

In some embodiments, the two-dimensional material comprises a tunable metal monochalcogenide. In some embodiments, the metal monochalcogenide has a composition of $MX_{0.75-1}$.

In some embodiments, depositing the amorphous two-dimensional material on the substrate with pulsed laser ablation comprises controlling a number of laser pulses to determine a thickness of the amorphous two-dimensional material.

In some embodiments, the method further includes photolithographically patterning the substrate with a device feature to generate a patterned substrate. In some embodiments, depositing the amorphous two-dimensional material comprises depositing the amorphous two-dimensional material after patterning the substrate on the patterned substrate. In some embodiments, patterning the substrate comprises patterning the substrate after crystallizing the amorphous two-dimensional material.

In some embodiments, the method further includes depositing a source electrode and a drain electrode on the two-dimensional monolayer or few-layer. In some embodiments, the method further includes applying a source electrode and a drain electrode to the substrate, wherein depositing the amorphous two-dimensional material comprises depositing the amorphous two-dimensional material on the source electrode or the drain electrode.

In some embodiments, activating the surface of the two-dimensional material with the biorecognition element comprises attaching a chemical linker to the surface of the two-dimensional material; activating the chemical linker after attaching the chemical linker to the surface; and attaching the biorecognition element after activating the chemical linker. In some embodiments, the chemical linker comprises 11-mercaptoundecanoic acid.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
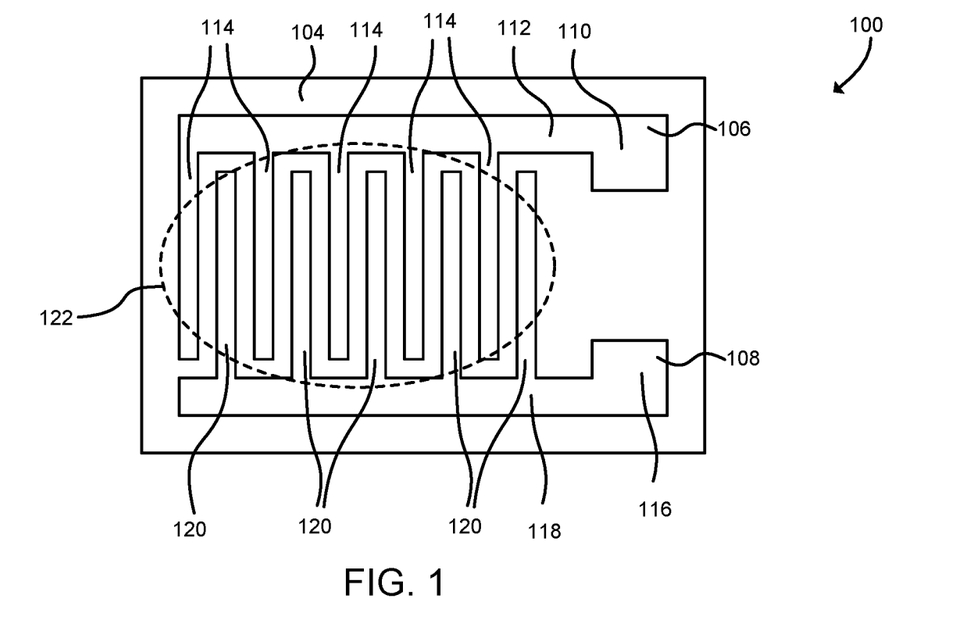
FIG. 1 is a simplified plan view of a biosensor device using two-dimensional materials.
Figure 2:
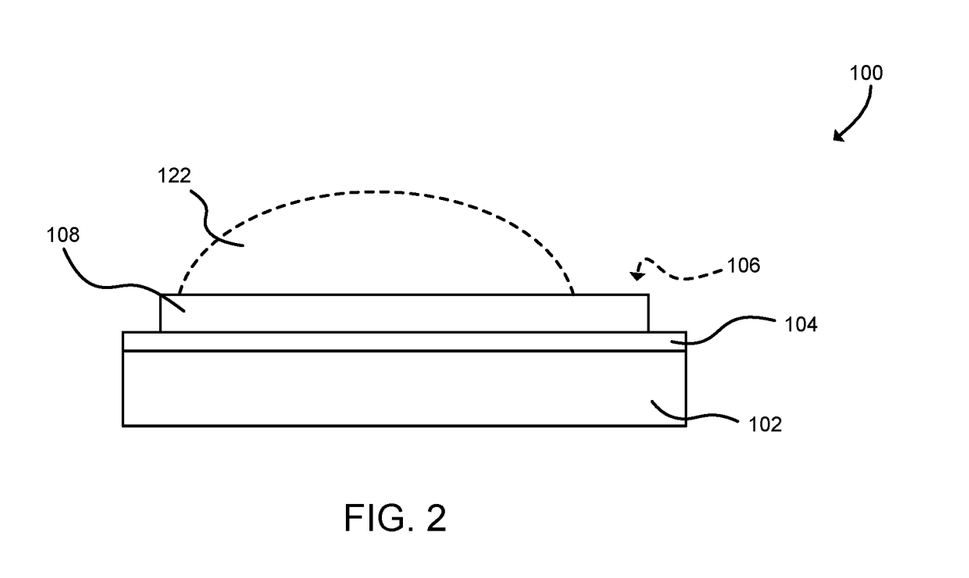
FIG. 2 is a simplified elevation view of the biosensor device of FIG. 1.

Referring now to FIGS. 1 and 2, a simplified schematic diagram of one illustrative embodiment of a biosensor device 100 is shown. The biosensor 100 is a field-effect transistor (FET) that includes a biorecognition element that binds with a pathogen such as the SARS-CoV-2 coronavirus responsible for COVID-19. As shown in FIG. 2, the biosensor device 100 includes a substrate 102, which may be embodied as a semiconductor such as bulk silicon with a silicon dioxide ($SiO_2$) layer on the surface. A functionalized metal chalcogenide 2D material 104 is positioned on the substrate 102. The 2D material 104 may be embodied as a monolayer of 2D material or a few layers of crystallized material (i.e., a 2D material few-layer). Thus, the 2D material 104 may be only a few atoms thick (e.g., 3 atoms, 6 atoms, 2 atoms, 4 atoms, or another relatively small number of atoms thick.) The 2D material 104 is illustratively a transition metal dichalcogenide and more particularly is a monolayer of tungsten selenide ($WSe_2$). In other embodiments, the 2D material 104 may be a different transition metal dichalcogenide ($MX_2$), a metal monochalcogenide (MX), or other 2D metal chalcogenide. Additionally, and as described further below, the 2D material 104 may have a tuned chemical composition. The 2D material 104 is functionalized by the addition of the biorecognition element, described further below.

Referring again to FIGS. 1 and 2, the biosensor device 100 further includes a pair of interdigitated electrodes 106, 108 formed on the 2D material 104. Each of the electrodes 106, 108 may be embodied as gold, titanium, copper, aluminum, or another metallic material. Illustratively, the electrode 106 includes a contact pad 110 and a trace 112 extending away from the contact pad 110. Multiple fingers 114 extend away from the trace toward the electrode 108. Similarly, the electrode 108 includes a contact pad 116 and a trace 118 extending away from the contract pad 116. Multiple fingers 120 extend away from the trace 118 toward the electrode 106. As described above, the fingers 114, 120 of the respective electrodes 106, 108 are interdigitated and alternate with each other across the biosensor device 100. Illustratively, each of the fingers 114, 120 of the electrodes 106, 108 may be separated by a channel width of about 30 µm. As described further below, this channel width may be bridged by one or more crystals of the 2D material 104, forming the channel of the FET-based biosensor device 100. The interdigitated arrangement of the source electrode 106 and the drain electrode 108 may increase detection area. Of course, in other embodiments any appropriate geometry of electrodes 106, 108 for a FET biosensor may be used.

As shown, an ionic gate solution 122 may be positioned over the electrodes 106, 108 and in contact with the 2D material 104. The ionic gate solution 122 may be embodied as an ionic solution such as 0.01× phosphate-buffered saline (PBS) in deionized water. A sample that potentially includes pathogens may be added directly to the ionic gate solution 122 to perform an exposure and detection process.

In use, each of the electrodes 106, 108 may act as a source electrode or a drain electrode for the FET-based biosensor device 100. Illustratively, the electrode 106 is referred to as the source electrode 106, and the electrode 108 is referred to as the drain electrode 108; however, in other embodiments the roles of the electrodes 106, 108 may be reversed. The 2D material 104 positioned between the electrodes 106, 108 may act as a channel for the FET-based biosensor device 100. The ionic gate solution 122 may act as a gate. In particular, voltage may be applied to the electrodes 106, 108, and a gate electrode (not shown) may apply a voltage to the ionic gate solution 122 in order to activate the biosensor device 100. Changes in electrical transport characteristics of the sensor device 100 (e.g., electrical current passed between the electrodes 106, 108) may be used to detect the presence of pathogens in the gate solution 122. In particular, interaction of pathogen particles with the functionalized surface of the 2D material 104 may modify electrical transport characteristics of the 2D material 104 and thus produce changes in electrical current passed through the channel of the FET-based biosensor device 100.

Figure 3:
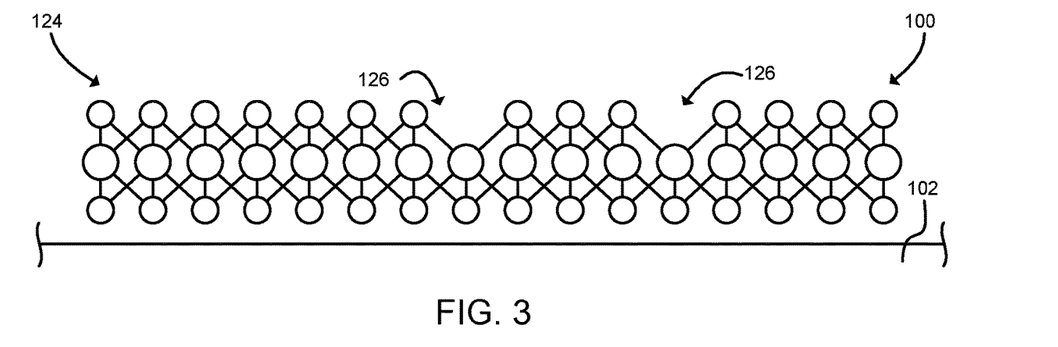
FIG. 3 is a simplified cross-sectional detail view of a two-dimensional material monolayer of the biosensor device of FIGS. 1-2.

As described above, the 2D material 104 is functionalized to detect a particular pathogen. Referring now to FIG. 3, a cross-sectional view of a crystallized 2D material monolayer 124 before functionalization is shown. The illustrative 2D material monolayer 124 is a transition metal dichalcogenide (TMDC), and more particularly a monolayer of tungsten diselenide ($WSe_2$). Additionally or alternatively, although illustrated in FIGS. 3-4 as a monolayer 124, it should be understood that in some embodiments the 2D material 104 may be embodied as a few-layer of $WSe_2$ or other TMDC. As shown in FIG. 3, the 2D material monolayer 124 is a crystallized monolayer that is adsorbed to the surface of the substrate 102. The crystallized monolayer 124 illustratively includes multiple vacancies 126 on its outer surface. Each vacancy 126 represents a location in the crystal lattice where an atom (e.g., a selenium atom) is missing from the regular crystal structure. These vacancies 126 may cause the crystallized monolayer 124 to exhibit p-type semiconductor properties. The number of vacancies 126 present in the crystallized monolayer 124 may be controlled by tuning composition of the 2D materials used to manufacture the crystallized monolayer 124, as described further below in connection with FIGS. 8-9.

Figure 4:
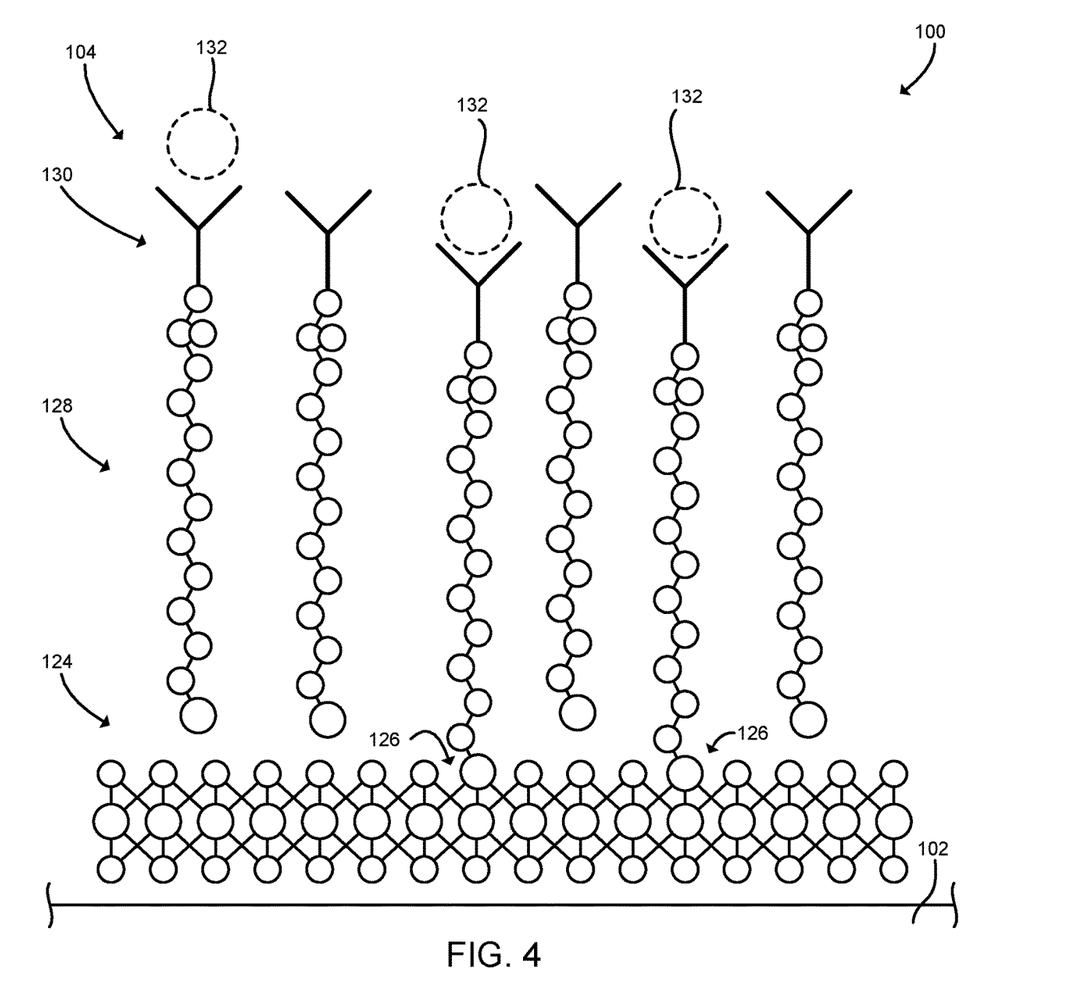
FIG. 4 is a simplified cross-sectional detail view of a functionalized two-dimensional material monolayer of the biosensor device of FIGS. 1-3.

Referring now to FIG. 4, a cross-sectional view of the 2D material 104 that has been functionalized is shown. The crystallized 2D material monolayer 124 is functionalized by attaching a linker chemical 128 to the surface of the 2D monolayer 124. Illustratively, the linker chemical 128 is 11-mercaptoundecanoic acid (MUA). As shown, the linker 128 may attach to the vacancies 126 in the 2D monolayer 124 through a chemisorption process. In particular, sulfur ions at the SH-terminated end of the MUA molecule may bond to the selenium vacancies in the $WSe_2$ crystal. The linker 128 may also attach to the surface of the 2D material monolayer 124 through physisorption, in which the MUA molecules are attracted by van der Waals interactions with other molecules and the 2D material monolayer 124 surface. The MUA linker 128 thus forms a self-assembled monolayer over the crystallized material monolayer 124. The MUA linker 128 and 2D monolayer 124 may have an average height of about 2.8 nm above the substrate 102, indicating that the MUA linker 128 is self-assembled into a vertical orientation as shown in FIG. 4. Next, the free end of the linker 128 is attached to a biorecognition element 130, which in the illustrative embodiment is an antibody 130. More particularly, the antibody 130 is a monoclonal antibody against the SARS-CoV-2 spike protein. During a detection process, the antibody 130 may bind with pathogen particles 132, such as SARS-CoV-2 spike proteins or whole virus particles. Although illustrated as a SARS-CoV-2 antibody 130, it should be understood that the biorecognition element 130 may be embodied as any other antibody, ligand, or other biorecognition element.

Figure 5:
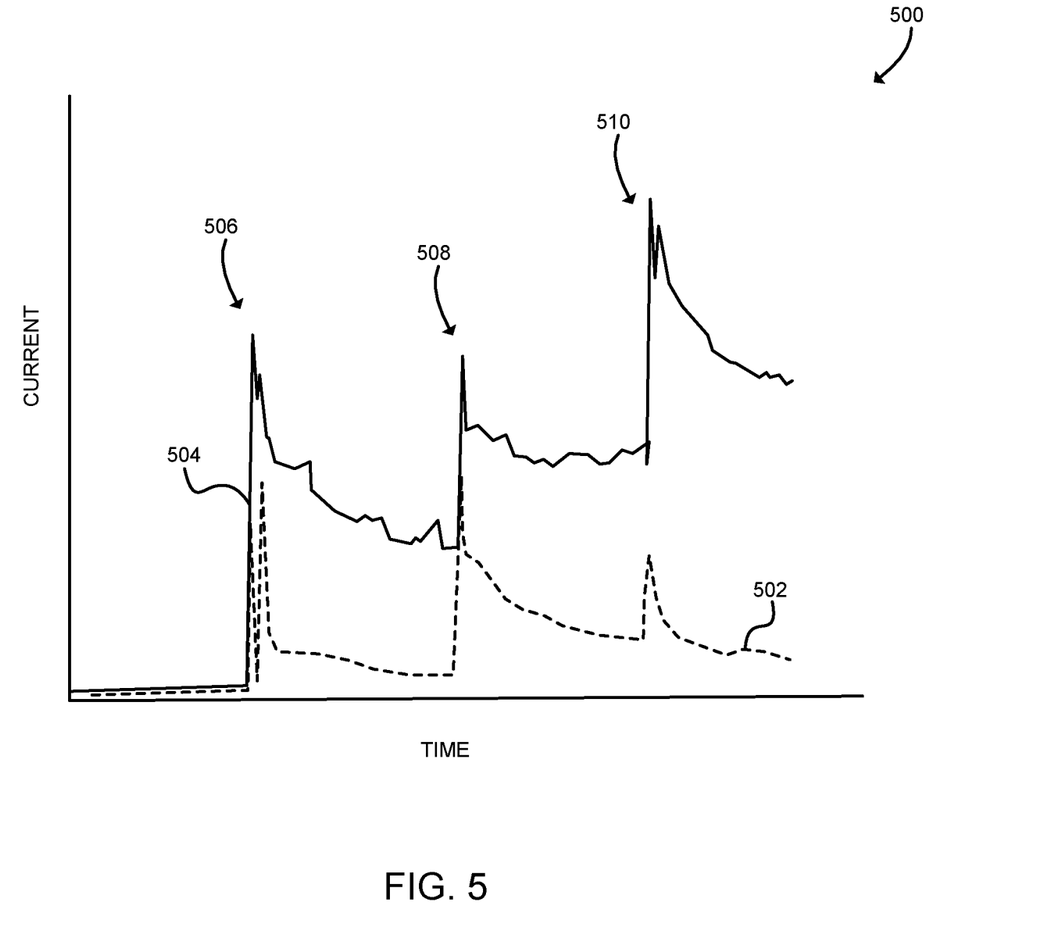
FIG. 5 is a plot illustrating test results that may be achieved by the device of FIGS. 1-4.

In use, the biosensor device 100 may be used to detect the presence of SARS-CoV-2 spike protein in a sample. Referring now to FIG. 5, plot 500 illustrates sample results that may be achieved by the device 100. The device 100 was illustratively operated by applying a voltage of 1 V between the drain electrode 108 and the source electrode 106. A voltage of −0.5 V was applied between the ionic gate solution 122 and the source electrode 106 when ionic gate solution 122 was present. Positive voltages applied from the gate solution 122 to the source electrode 106 may turn off the device 100 and thus are not used for detection.

To characterize the device 100, a series of drops of pure ionic liquid (8 µL each of 0.01×PBS) were dropped on the device 100 and electrical current between the source electrode 106 and the drain electrode 108 was measured. Curve 502 of the plot 500 illustrates the measured current for pure ionic gate solution 122. Peaks 506, 508, 510 correspond to the addition of drops of pure ionic gate solution 122 to the device 102. As shown, each of the peaks 506, 508, 510 for the curve 502 are relatively low and decay back toward zero.

Detection was tested by dropping a series of drops (8 µL each) of ionic solution including SARS-CoV-2 spike protein at increasing concentrations and measuring current between the source electrode 106 and the drain electrode 108. Curve 504 of the plot 500 illustrates measured current for ionic solution with SARS-CoV-2 spike protein. The peaks 506, 508, 510 correspond to the addition of drops including concentrations of SARS-CoV-2 spike protein of 25 fg/µL, 200 fg/µL, and 1.66 pg/µL, respectively. As shown, the peaks 506, 508, 510 for the curve 504 are relatively higher and show clear stepwise increases in current. Additionally, current continued to increase for higher concentrations of spike protein (not shown). It is believed that chemisorption of MUA molecules onto the selenium vacancies 126 of the $WSe_2$ crystals may decrease conductivity by reducing p-type semiconductor behavior. Conductivity then increases after the addition of the SARS-CoV-2 antibody and spike proteins, which may be due to charge transfer processes.

Accordingly, the plot 500 illustrates successful detection of SARS-CoV-2 spike protein by the biosensor device 100 at concentrations down to 25 fg/µL in 0.01×PBS. Additional tests demonstrated selective response of the biosensor device 100 to SARS-CoV-2. For example, the current response for a sample including bovine serum albumin (BSA) was negligible compared to the response for a sample including SARS-CoV-2 spike protein, which indicates selective detection of SARS-CoV-2. Thus, the biosensor device 100 is capable of detecting SARS-CoV-2 spike proteins in a sample and thus may provide for rapid, sensitive, and selective detection of SARS-CoV-2 in vitro. Further, the biosensor device 100 may be used with different biorecognition elements 118 (e.g., different antibodies) to target different pathogens, cytokines, proteins, or other biomarkers.

Figure 6:
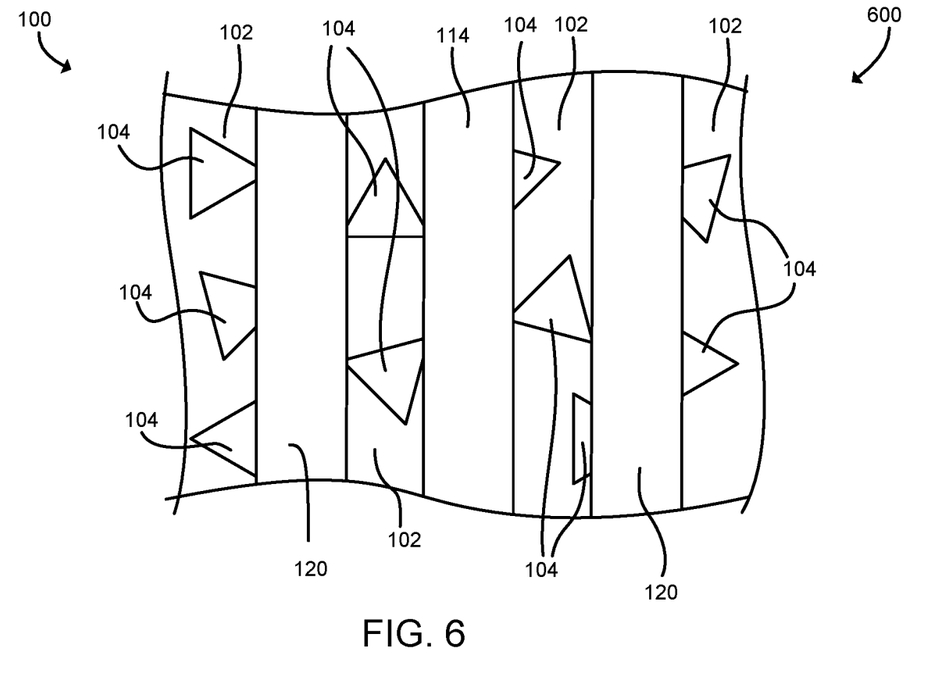
FIG. 6 is a detail view of at least one embodiment of the device of FIGS. 1-4.

Referring now to FIG. 6, a detail view of one potential embodiment of a biosensor device 600 is shown. The biosensor device 600 is an illustrative embodiment of a biosensor device 100 in which the 2D material 104 is grown as crystals on the substrate 102 using a chemical vapor deposition (CVD) process. As shown, the 2D material 104 forms triangular $WSe_2$ crystals on the surface of the substrate 102. The crystals are randomly distributed on the substrate 102, and each crystal has a width of about 20 to 40 µm. Each 2D material 104 crystal that contacts both a finger 114 of the source electrode 106 and a finger 120 of the drain electrode 108 may act as a channel for the biosensor device 600. Therefore, because the distribution of 2D material 104 crystals varies between individual biosensor devices 600, the channel configuration and electronic characteristics of each biosensor device 600 also varies. Accordingly, each biosensor device 600 may be calibrated using pure ionized liquid as the ionic gate solution 122 before analyzing a sample, as described above in connection with FIG. 5.

Figure 7:
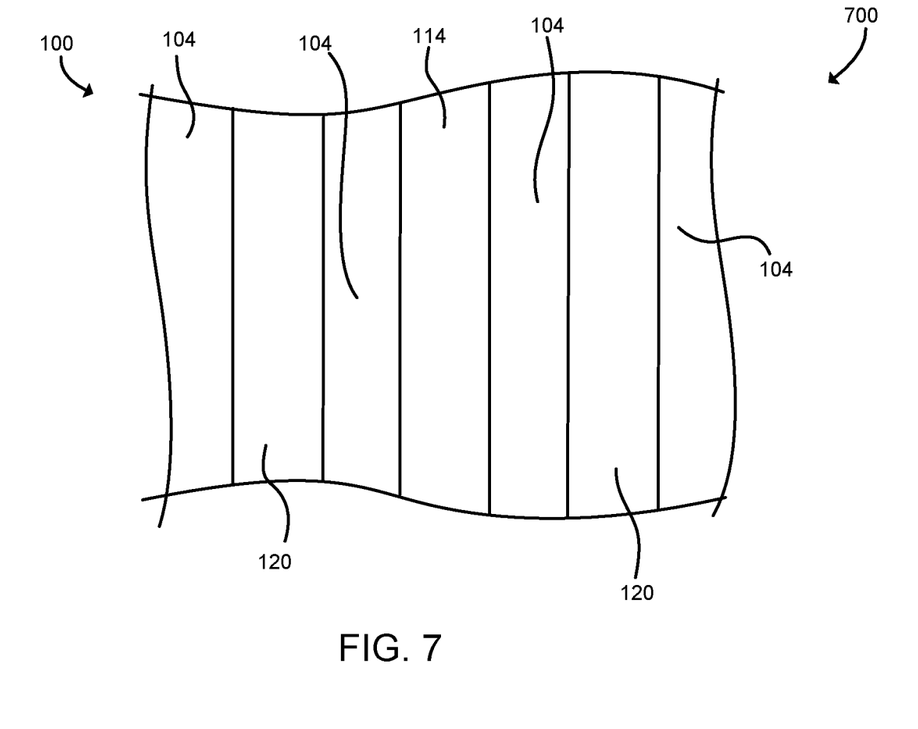
FIG. 7 is a detail view of at least one other embodiment of the device of FIGS. 1-4.

Referring now to FIG. 7, a detail view of another potential embodiment of a biosensor device 700 is shown. The biosensor device 700 is an illustrative embodiment of a biosensor device 100 that is manufactured using a pulsed laser deposition process. One potential embodiment of a method for manufacturing the device 700 is described below in connection with FIGS. 8 and 9. The illustrative biosensor device 700 includes a 2D material 104 that covers the entire substrate 102 between the electrodes 106, 108. The 2D material 104 may be, for example, a single $WSe_2$ crystal that covers the entire substrate 102. As described above, the 2D material 104 may include a single layer of $WSe_2$ crystal or a few layers of $WSe_2$ crystal. Thus, in the embodiment shown in FIG. 7, the entire 2D material 104 between the fingers 114, 120 of the electrodes 106, 108 may act as the channel for the biosensor device 700. Thus, each individual biosensor device 700 may have similar electronic characteristics, and a single, predetermined calibration may be used for all individual biosensor devices 700. Additionally, due to the greater relative surface area of 2D material 104 that may act as the channel, the device 700 may be more sensitive than a corresponding device 600 as shown in FIG. 6.

Figure 8:
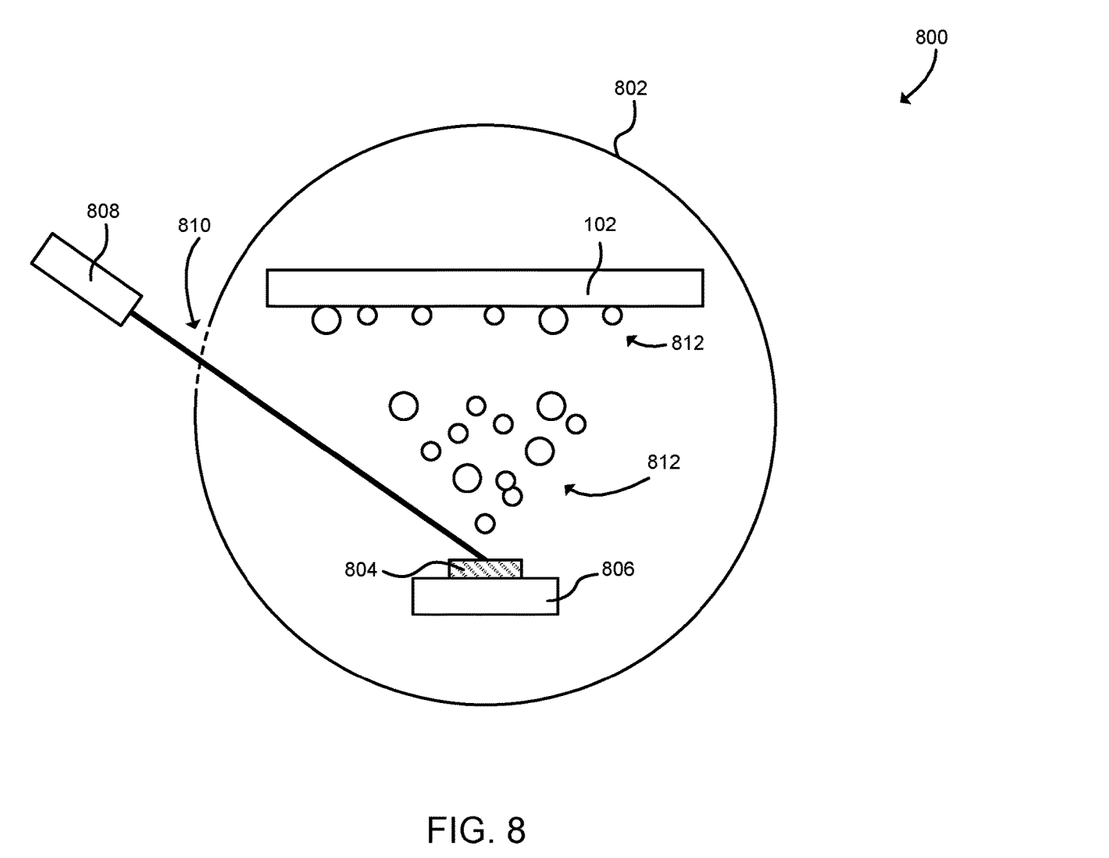
FIG. 8 is a simplified schematic diagram illustrating a method for manufacturing the biosensor device of FIGS. 1-4 and 7.

Referring now to FIG. 8, diagram 800 illustrates a pulsed laser ablation (PLA)/pulsed laser deposition (PLD) process that may be used to manufacture a biosensor device 100. A prepared substrate 102 is placed inside a vacuum chamber 802. The substrate 102 may be photolithographically patterned with one or more device features (e.g., source, drain, channel, etc.) prior to being placed in the vacuum chamber 802. A two-dimensional material target 804 is placed on a target carousel 806 in the vacuum chamber 802. The two-dimensional material target 804 includes elements that will form the 2D material 104, for example tungsten and selenium or other metal and chalcogenide atoms. The composition of the target 804 is tunable. For example, for a transition metal dichalcogenide, composition of the target 804 may vary between $MX_{1.5}$ to $MX_2$.

A laser 808 is aimed at the target 804 through a window 810 in the vacuum chamber 802. The laser 808 is illustratively an excimer laser (KrF 248 nm, 20 ns pulse-width, and fluence of 2 $J/cm^2$). In use, the laser 808 performs a number of laser pulses that ablate the target 804. This ablation causes an amorphous precursor 812 of the two-dimensional material to be deposited on the substrate 102. The amorphous precursor 812 includes a precise amount of stoichiometric amorphous 2D materials that may be formed into the crystallized monolayer or few-layer 104 as described further below. The thickness of the amorphous precursor 812 may be controlled by controlling the number of pulses performed by the laser 808. The PLD process may be performed at or near ambient temperature (e.g., at temperatures below about 150° C.). Therefore, the PLD process may be performed on a patterned substrate 102 and is otherwise compatible with photolithographic processes.

Accordingly, the PLD process shown in FIG. 8 and described further below in connection with FIG. 9 may allow for formation of stoichiometric amorphous materials as a solid-state precursor for the controlled growth of 2D layered crystals and hybrid structures with precise control over their chemical composition, physical dimensions, and growth locations. Accordingly, the process described herein may provide more deterministic, improved growth of 2D materials and hybrid structures as opposed to conventional gas-phase growth. Additionally, due to its compatibility with device fabrication technologies such as the photolithography process, the manufacturing techniques described herein may enable integration of 2D quantum materials in to current and related future technologies.

Figure 9:
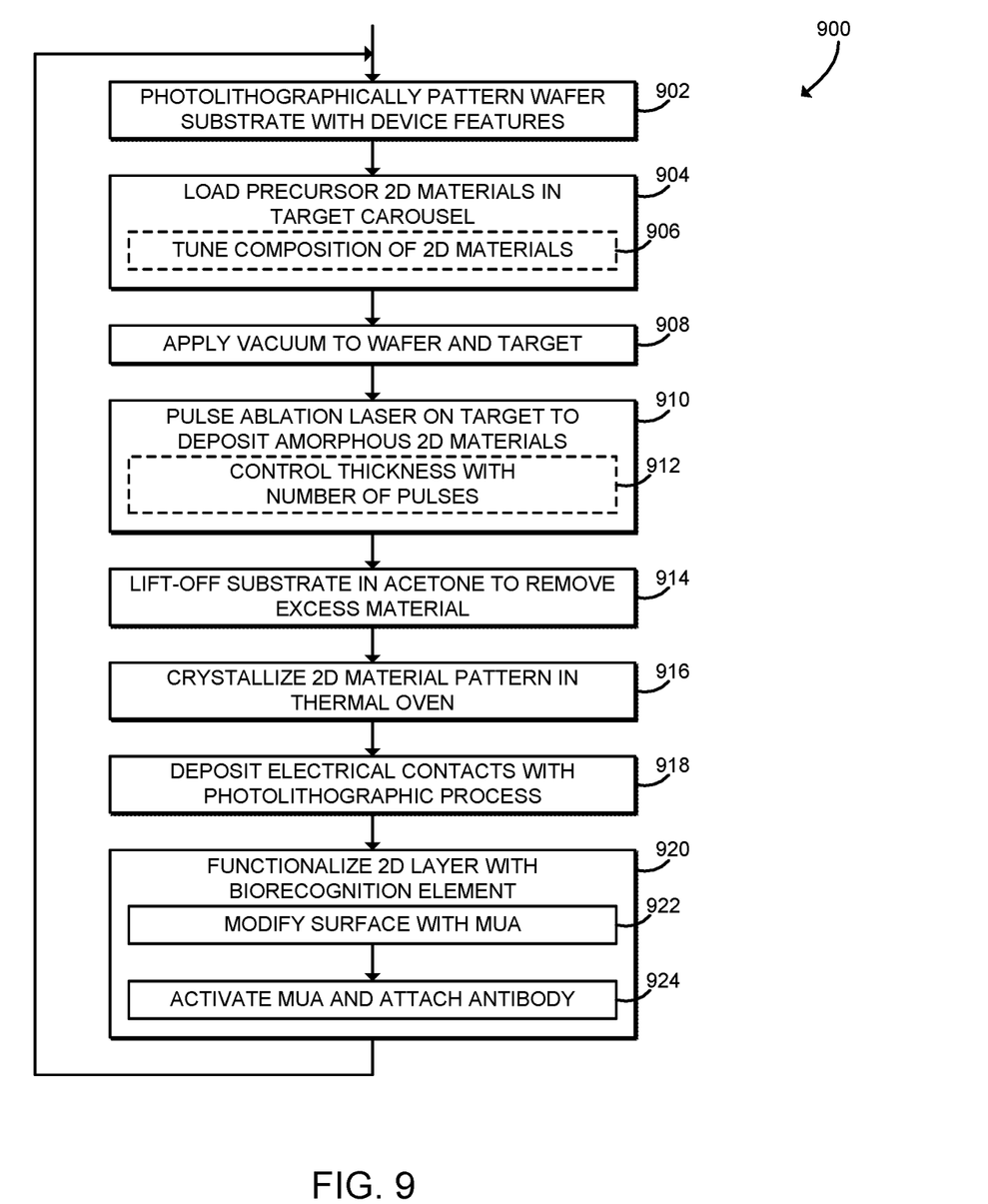
FIG. 9 is a simplified flow diagram of one illustrative embodiment of the manufacturing method of FIG. 8.

Referring now to FIG. 9, one illustrative embodiment of a method 900 that may be used to fabricate the biosensor device 100 is shown as a simplified flow diagram. The method 900 is illustrated as a series of blocks 902-924, some which may be optionally performed in some embodiments (and, thus, are shown in dashed lines). It will be appreciated by those of skill in the art that some embodiments of the method 900 may include additional or different processes and sub-processes, such as various pre- and post-processing techniques.

The method 900 may begin with block 902, in which a wafer substrate 102 is photolithographically patterned with one or more device features. The substrate 102 may be embodied as a silicon wafer with silicon dioxide coating, for example a 4-inch wafer. The wafer substrate 102 may be patterned with device features including transistor features such as source, drain, channel, or other device geometry. In some embodiments, multiple instances of the biorecognition device 100 may be patterned on the same wafer substrate 102. After patterning, the wafer substrate 102 may have photoresist or other chemicals positioned on the surface of the substrate 102 that define the device features. After patterning, the substrate 102 is positioned in the vacuum chamber 802 with the patterned surface facing the target carousel 806.

In block 904, a target 804 including precursor 2D materials is loaded in the target carousel 806. For example, a 1-inch target of transition metal dichalcogenide such as $WSe_2$ may be placed on the target carousel. When in position, the substrate 102 may be located, for example, about 13 centimeters above the target 804. In some embodiments, in block 906, composition of the precursor 2D materials 804 may be tuned. In particular, the ratio of particular elements in the target 804 may be adjusted in order to achieve a desired stoichiometric composition of the fabricated 2D material 104. For example, as discussed above, the linker chemical 128 may bond to surface vacancies 126 in the crystallized monolayer 124. Accordingly, in order to produce a crystallized monolayer 124 with a certain number of vacancies 126, the ratio of chalcogenide atoms to metal atoms may be reduced. Continuing that example for transition metal dichalcogenides such as $WSe_2$, the composition of the target 804 may be tuned to include between 1.5 to 2.0 chalcogen atoms for each transition metal atom (i.e., a composition of $MX_{1.5}$ to $MX_2$). Similarly, for metal monochalcogenides, the composition of the target 804 may be tuned to include between 0.75 to 1.0 chalcogen atoms for each metal atom (i.e., a composition of $MX_{0.75}$ to $MX_1$).

In block 908, the vacuum chamber 802 applies a vacuum to the wafer substrate 102 and the target 804. The vacuum chamber 802 may pump down to, for example, about $10^{-6}$ Torr.

In block 910, the ablation laser 808 is pulsed on the target 804. The laser pulses ablate 2D precursor material 812 from the target 804 and cause amorphous 2D materials 812 to deposit on the surface of the wafer substrate 102. In some embodiments, the thickness of the amorphous 2D material deposited on the substrate 102 may be controlled by controlling the number of pulses of the laser 808.

In block 914, a lift-off process may be performed on the substrate 102 using acetone to remove excess material. The lift-off process may remove, for example, photoresist material and excess amorphous 2D material. After performing the lift-off process, the patterned amorphous 2D material remains positioned on the substrate 102.

In block 916, the amorphous 2D material precursor 812 is crystallized in a thermal oven. For example, the substrate 102 including the amorphous 2D material precursor 812 may be annealed in a 3-zone quartz tube thermal oven in a controlled atmosphere of argon buffer gas environment.

Crystallization temperature may depend on the particular 2D material being produced. For example, amorphous MoS$_2$ nanosheets may be converted to crystalline structures at temperatures from 450° C. up to 700° C. and more particularly at about 500° C.

In block 918, one or more electrical contacts may be deposited on the substrate 102 and/or the crystallized 2D material 104 using a photolithographic process. For example, one or more gold electrical contacts may be deposited using positive photolithography in a cleanroom environment. Illustratively, the source electrode 106 and the drain electrode 108 are deposited over the crystallized 2D material 104. Additional features such as dielectric layers, gate contacts, and other features may also be deposited using one or more photolithographic processes. Additionally or alternatively, although illustrated as occurring after deposition and crystallization of the monolayer or few-layer 104, it should be understood that in some embodiments one or more electrical contacts or other features may be deposited on the substrate 102 before deposition of the 2D material 104.

In block 920, the crystallized 2D material 104 is functionalized with a biorecognition element. In the illustrative process, the 2D material 104 is functionalized using a two-step process in which a linker chemical 128 is attached to the surface of the 2D material 104 and then the biorecognition element 130 is attached to the linker chemical 128. In block 922, the surface of the crystallized monolayer or few-layer 104 is modified with the linker chemical 128, which is illustratively 11-mercaptoundecanoic acid (MUA). As described above, the SH terminated end of the MUA molecule strongly interacts with the chalcogen atoms and preferably vacancy sites 126 on the surface of the WSe$_2$ crystal 124 and thus attaches to its surface. In block 924, the MUA molecule is activated, and a SARS-CoV-2 antibody is attached to the activated MUA. In particular, the upper-end carboxyl group of the MUA molecule is activated to form n-hydroxysuccinimide ester by exposure of the MUA assembly to n-hydroxysuccinimide (NHS) and carbodiimide hydrochloride (EDC) solution at room temperature. A volume ratio of NHS to EDC of 100 mM/400 mM and an exposure time of 6 hours may be used. After activation, the device is immersed into a SARS-CoV-2 solution. The active ester of the MUA molecule is susceptible to nucleophilic attack and will then react with amino groups provided by antibodies, leading to the formation of an amide bond. After functionalizing the 2D material 104, the biosensor device 100 is completed. The method 900 loops back to block 902, in which additional biosensor devices 100 may be manufactured.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A method for manufacturing a field-effect transistor biosensor to detect pathogens in a sample, the method comprising:

depositing an amorphous two-dimensional material on a substrate with pulsed laser ablation;

crystallizing the amorphous two-dimensional material to generate a two-dimensional monolayer or few-layer coupled to the substrate; and activating a surface of the two-dimensional material with a biorecognition element for pathogen detection after crystallizing the amorphous two-dimensional material.

2. The method of claim 1, wherein:

depositing the amorphous two-dimensional material comprises depositing the amorphous two-dimensional material at ambient temperature; and crystallizing the amorphous two-dimensional material comprises crystallizing the amorphous two-dimensional material with a thermal oven.

3. The method of claim 2, wherein depositing the amorphous two-dimensional material at ambient temperature comprises depositing the amorphous two-dimensional material at an operating temperature below 150° C.

4. The method of claim 1, wherein the two-dimensional material comprises a compositionally tunable transition metal dichalcogenide.

5. The method of claim 4, wherein the transition metal dichalcogenide has a composition of $MX_{1.5-2}$.

6. The method of claim 1, wherein the two-dimensional material comprises a tunable metal monochalcogenide.

7. The method of claim 6, wherein the metal monochalcogenide has a composition of $MX_{0.75-1}$.

8. The method of claim 1, wherein depositing the amorphous two-dimensional material on the substrate with pulsed laser ablation comprises controlling a number of laser pulses to determine a thickness of the amorphous two-dimensional material.

9. The method of claim 1, further comprising photolithographically patterning the substrate with a device feature to generate a patterned substrate.

10. The method of claim 9, wherein depositing the amorphous two-dimensional material comprises depositing the amorphous two-dimensional material after patterning the substrate on the patterned substrate.

11. The method of claim 9, wherein patterning the substrate comprises patterning the substrate after crystallizing the amorphous two-dimensional material.

12. The method of claim 1, further comprising depositing a source electrode and a drain electrode on the two-dimensional monolayer or few-layer.

13. The method of claim 1, further comprising applying a source electrode and a drain electrode to the substrate, wherein depositing the amorphous two-dimensional material comprises depositing the amorphous two-dimensional material on the source electrode or the drain electrode.

14. The method of claim 1, wherein activating the surface of the two-dimensional material with the biorecognition element comprises:

attaching a chemical linker to the surface of the two-dimensional material, wherein the chemical linker comprises 11-mercaptoundecanoic acid;

activating the chemical linker after attaching the chemical linker to the surface; and attaching the biorecognition element after activating the chemical linker.

* * * * *